May 9, 1933.  J. LEDWINKA  1,908,517
VEHICLE BODY CONSTRUCTION
Filed Sept. 22, 1928  2 Sheets-Sheet 1
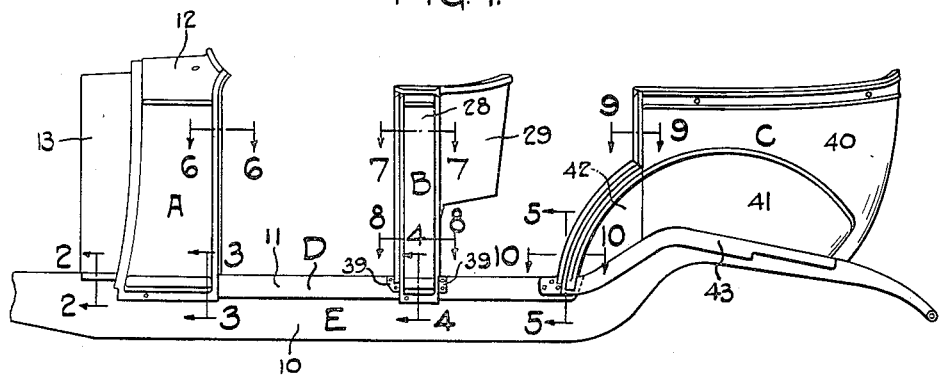
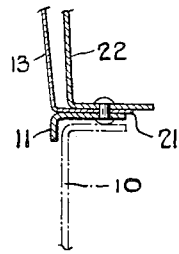
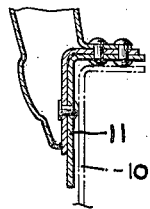
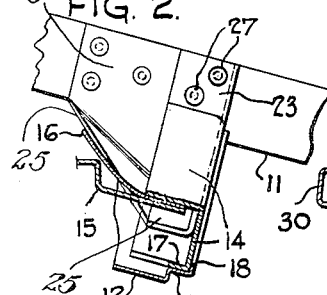
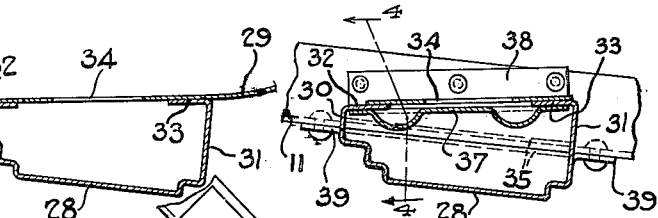
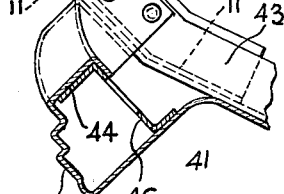
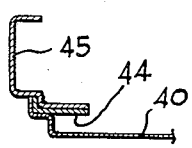
INVENTOR.
JOSEPH LEDWINKA.
BY
ATTORNEY.

May 9, 1933. J. LEDWINKA 1,908,517
VEHICLE BODY CONSTRUCTION
Filed Sept. 22, 1928 2 Sheets-Sheet 2
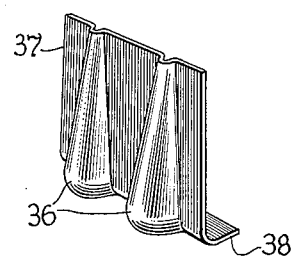
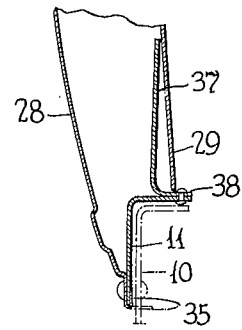
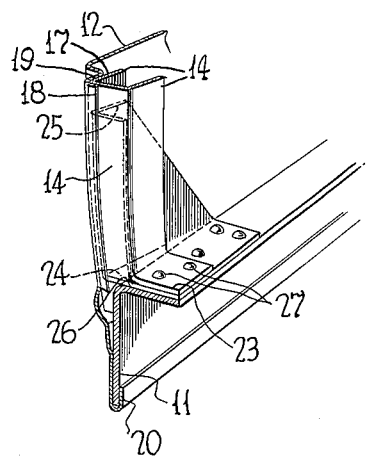
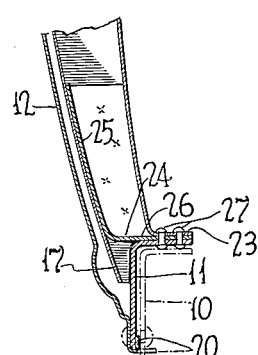
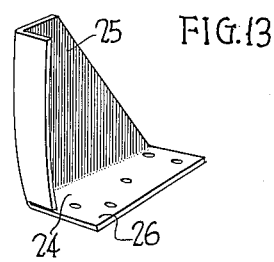
INVENTOR
JOSEPH LEDWINKA.
BY
John P. Jacoby
ATTORNEY Patented May 9, 1933

1,908,517

UNITED STATES PATENT OFFICE

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA

VEHICLE BODY CONSTRUCTION

Application filed September 22, 1928. Serial No. 307,568.

The invention relates to automobile bodies and more particularly to bodies built up out of sheet metal stampings.

It is an object of my invention to construct a body of this class which is light in weight, yet most strong and durable, one which is simple in construction and hence low in cost of manufacture, and one which is characterized by roominess and easy riding qualities.

I attain these objects in large part by having certain elements and functions heretofore inherent in the body, as elements and functions of the chassis, and by widening out the chassis to accommodate it to the width of the body associated therewith, whereby a perfect nesting of the sides of the body and chassis results and the two can be tied together in final assembly to reinforce each other and to form a unitary combined body and chassis structure. Other advantages and economies are attained by a simplification of the structure by forming it in fewer stampings than heretofore, by joining these together in a most efficient manner and finally by a division of the body into efficient sub-assembly units which can be readily manufactured and shipped and finally assembled in a final assembly jig.

Other objects and advantages will become apparent from the following detailed description when read in connection with the accompanying drawings forming a part thereof.

In the drawings:—

Fig. 1 is a view inside elevation of a body embodying my invention.

Figs. 2 to 10 inclusive are detail sectional views taken on the correspondingly numbered lines of Fig. 1.

Fig. 11 shows in perspective the bracket illustrated in section in Figs. 4 and 8.

Fig. 12 is a perspective view of the post construction shown in section in Fig. 2.

Fig. 13 is a perspective view of the angle bracket used in a post of Fig. 12 for securing the post to the sill.

I have shown my invention as embodied in a touring type of body and as consisting preferably of the following sub-assemblies the cowl sub-assembly A, the front seat sub-assembly B, the tonneau sub-assembly C and the main side sills D. The chassis upon which the body proper is shown mounted is designated E.

As shown in my prior application Serial No. 282,498, June 2, 1928, now Patent No. 1,825,323, dated Sept. 29, 1931, for combined body and chassis construction, the body of my invention is preferably associated with an underframe or chassis in which the side sills 10 are widened out to conform to the lines of the lower edge of the body. As shown in the main view and the various sectional views, the body side sill 11 is of angle section from end to end, and conforms to the contour of the chassis sills 10, so as to nest therewith and thus enable the body to be strongly secured to the chassis sills, which are of relatively deep section so as to form with the cross braces (not shown) a rigid underframe structure. In the thresholds the body side sill itself forms the thresholds and since this nests with the chassis sills the thresholds are not substantially higher than the chassis.

The cowl subassembly comprises the cowl paneling 12 forming the rear or normal section portion of the cowl and the reduced forward extension 13, the door posts 14 rising at the rear edge of the cowl, the cowl braces as 15, and the instrument board 16. The door post 14 (Figs. 6 and 12) is of forwardly that is, longitudinally, presenting channel form, the bottom wall of the channel forming the door jamb at the hinge side of the front door and the rear edge of the cowl panel laps over the outside wall of the channel at 17 and is connected thereto as by spot welding, the extreme edge of the panel being carried around to the bottom wall of the channel as at 18 to provide a good finish. The rabbet 19 to receive the door overlap flange is formed in the edge of the panel 12. The lower edge of the panel is formed with a flange 20, which prior to final assembly extends inwardly, as shown in dotted lines, Fig. 3, substantially at right angles to the adjacent portion of the body of the panel. In the final assembly, this flange 20 is crimped over the edge of the sill as shown in full lines in Fig. 3.

The reduced forward extension paneling 13 is flanged inwardly at 21, which flange in final assembly rests on top of the forward end of the sill 11, and is secured thereto, as by rivets as in Fig. 2. The toe board supporting bracket 22 rests on the flange 21 and is secured thereto, as by welding. The rivets securing the flange 21 to the sill also pass through the base flange of this toe board support, see Fig. 2.

At the bottom the outer side wall of the channel post 14 (Fig. 6 and Fig. 12) extends downwardly to a point some distance above the lower edge of the panel 12, and the inner side wall is turned inwardly to form a tab 23 which in the final assembly overlies the sill. To form a very strong joint between post and sill the outer side wall is provided with an extension in the form of an angle bracket 24, one arm 25 of which is welded to the inner surface of the outer side wall of the post 14, and the other arm 26 underlies the tab 23 and extends between it and the top of the side sill 11. In the final assembly the two side walls of the post are securely anchored to the top of the sill by the common securing rivets 27. Cowl side braces 15 and instrument board 16 are secured to the inside of the post 14 as shown in Fig. 6.

The front seat unit B comprises three main stampings, two inwardly presenting channel stampings 28, one at each side of the body, and the front seat back panel 29 which may be made in several stampings if desired. The front seat back panel 29 is extended forwardly at the sides and bridges the mouths of the channel-shaped stampings 28 and forms therewith closed box-section B—C post structures.

The side walls 30 and 31 of a stamping 28 form respectively, the jamb of the front door at the lock side and the jamb of the rear door at the hinge side; while the bottom wall forms the side paneling of the body between the front and rear door openings. At their inner edges the side walls 30 and 31 are flanged as at 32 and 33, the flanges extending toward each other, and the portion of the seat back panel 29 bridging the mouth of the channel makes lap joints with the flanges 32 and 33 and is rigidly secured thereto, as by spot welding. Access for spot welding to the interior of the post structures is had through suitable openings 34 provided in that portion of the back seat panel bridging the mouths of the channels.

In the final assembly the lower end of each post structure overlaps the outer side of the adjacent side sill, and is secured thereto by crimping the inwardly extending edge flange 35, shown in dotted lines in Fig. 4, of the bottom wall of the channel stamping over the edge of the sill. Further securement of the post is with the top of the sill. An angle member 36 (Fig. 11) has one arm 37 thereof telescoped with the hollow post and is corrugated for strength and secured as by welding to the inside of the flanges 32 and 33, while its other arm 38 extends horizontally so as to rest on top of the sill to which it is rigidly secured in assembly by riveting or otherwise.

To still further strengthen the securement of the post structures to the sill, each structure has portions of the side walls of the channel stamping, as 28, turned outwardly to form tabs 39 which lie against the outer wall of the sill and are rigidly secured thereto as by riveting, see Figs. 1 and 8.

The tonneau unitary sub-assembly comprises the tonneau paneling 40, having the wheel housing depression as 41 formed therein, the post D brackets 42 forming the forward portion of the wheel housing and the lower portion of the D-post structure, the tonneau side sills 43, braces and seat pan, etc., not shown. Along its forward edge the post D bracket is curved to conform to the wheel housing and is formed to provide a rearwardly presenting channel section post portion 44, the bottom wall of which forms the jamb of the rear door at the hinge side. As shown in Fig. 1 and 9, the upper portion of the post D bracket is of angular section and the D post is extended upwardly from the post D bracket by the channel extension 45 nested with the forward post portion of the bracket in their overlapping portion and secured thereto as by welding. The channel post portion of post D bracket is interbraced at spaced points by braces 46 extending across the mouth of the channel.

In the final assembly the tonneau side sill 43 which forms the rear portion of the body side sill is joined to the rear end of the forward section of the main side sill 11 which extends from the front of the cowl to the "kick up" by a lap joint and the parts so lapped are then securely rivetted together, see Fig. 5. The channeled D-post portion of the post D bracket is strongly secured to the sill structure by having the lower edge of its outer side wall welded to the lower edge of the tonneau sill section. It is still further secured to the top of the sill by an angle bracket or tab 49 extending laterally from the inner wall of the post channel and overlying the sill and secured thereto, as shown in Fig. 5, by the same rivets which join the sill sections.

What I claim as new and useful is:

1. In a vehicle body construction a sill of angular form having a downwardly extending arm on its outer side, a post structure of hollow section having its inner wall joined to the sill by an angle bracket, one arm of which is joined to the inner wall of the post and the other arm of which is joined to the sill, the outer wall of the post extending down over the outer side of the sill and being crimped over the lower edge of the outer downwardly extending arm of the sill.

2. In a vehicle body construction, a sill, a post structure comprising an inwardly presenting channel having its side walls flanged inwardly toward each other, a seat back panel extending forwardly to cover the mouth of said channel and secured to the outer side of said flanges, and an angle bracket for securing the post structure to the sill, having one arm thereof secured to the inner side of said flanges and further interbracing the side walls of the channel.

3. In a vehicle body construction, a sill of angular form having an outer downwardly extending arm, a combined post and panel structure secured to said sill, the outer side of the wall of said combined structure serving as paneling being secured to the sill by crimping over the edge of the downwardly extending arm of the sill and the structure being further secured to the top of the sill by an angle bracket.

4. In a structure for vehicle bodies, a sill of angular form having on its outer side a downwardly extending arm, a panel secured to the bottom edge of said sill by crimping its lower edge over the edge of said arm, a post secured to the top of said sill, the rear edge of the panel being secured to said post, and means interbracing said post and the forward portion of the panel.

5. In a vehicle body construction, a sill, a longitudinally extending channel section post having its outer wall extended inwardly to overlap the top of the sill by a bracket and the inner side wall being formed with a laterally extending tab overlying said bracket, and means commonly securing said tab and bracket to the sill.

6. In a vehicle construction, a sill of angular form having its outer wall formed by a downwardly extending arm, a combined post and panel structure of inwardly facing channel structure overlapping the outer wall of said sill and having its side walls provided with outwardly extending tabs secured to the sill, and its bottom or outer wall crimped over the lower edge of the downwardly extending arm of the sill.

7. In a vehicle body construction, a longitudinally extending sill, a longitudinally presenting channel section post having that portion of its side walls above the sill extending substantially in upright position, the outer and inner side walls having lateral extensions with overlapping portions resting on and secured to the top of the sill.

In testimony whereof I hereunto affix my signature.

JOSEPH LEDWINKA.